(12) United States Patent
King et al.

(10) Patent No.: US 7,735,894 B2
(45) Date of Patent: Jun. 15, 2010

(54) TAILGATE ASSEMBLIES AND VEHICLES INCLUDING SAME

(75) Inventors: Darin D. King, Raymond, OH (US); Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 392 days.

(21) Appl. No.: 11/800,734

(22) Filed: May 7, 2007

(65) Prior Publication Data

US 2008/0277958 A1    Nov. 13, 2008

(51) Int. Cl.
    *B62D 33/03*    (2006.01)
(52) U.S. Cl. ........................................... 296/62
(58) Field of Classification Search ............... 296/61, 296/62

See application file for complete search history.

(56) References Cited

U.S. PATENT DOCUMENTS

| | | | | |
|---|---|---|---|---|
| 3,713,553 | A | * | 1/1973 | Curtis et al. ............ 414/537 |
| 3,889,997 | A | | 6/1975 | Schoneck |
| 4,846,487 | A | | 7/1989 | Criley |
| 5,205,603 | A | | 4/1993 | Burdette, Jr. |
| 5,312,150 | A | | 5/1994 | Quam |
| 5,549,312 | A | | 8/1996 | Garvert |
| 5,732,996 | A | | 3/1998 | Graffy et al. |
| 5,988,725 | A | * | 11/1999 | Cole ........................ 296/61 |
| 6,116,378 | A | | 9/2000 | Barrow |
| 6,237,927 | B1 | | 5/2001 | Debo |
| 6,378,927 | B1 | * | 4/2002 | Parry-Jones et al. ......... 296/61 |
| 6,422,342 | B1 | | 7/2002 | Armstrong et al. |
| 6,764,123 | B1 | * | 7/2004 | Bilyard ........................ 296/61 |
| 6,840,526 | B2 | | 1/2005 | Anderson et al. |
| 6,857,680 | B2 | | 2/2005 | Fielding |
| 6,905,158 | B1 | | 6/2005 | Bastian |
| 6,918,624 | B2 | | 7/2005 | Miller et al. |
| 6,942,272 | B2 | | 9/2005 | Livingston |
| 6,964,444 | B2 | | 11/2005 | Chumley et al. |
| 6,966,597 | B2 | | 11/2005 | Tegtmeier |
| 6,971,478 | B2 | | 12/2005 | Bareket |
| 2002/0070577 | A1 | | 6/2002 | Pool, III et al. |
| 2005/0121933 | A1 | | 6/2005 | Livingston |

OTHER PUBLICATIONS

2008 Ford Super Duty: More Capability, More Features and More Refinement For America's Leading Workhorse [online], [retrieved May 7, 2007]. Retrieved from the Internet <URL: http://media.ford.com/newsroom/feature_display.cfm?release=23937>.

* cited by examiner

*Primary Examiner*—Joseph D Pape
(74) *Attorney, Agent, or Firm*—Ulmer & Berne LLP

(57) ABSTRACT

A tailgate assembly is provided for a cargo bed of a vehicle. The tailgate assembly includes a support panel and a tailgate panel. The support panel is configured for attachment to a vehicle such that the support panel is selectively pivotable between horizontal and vertical positions. The tailgate panel is attached to the support panel. The tailgate panel is configured to selectively define an end wall for the cargo bed when the support panel is in the horizontal position. The tailgate panel is configured to selectively define a step when the support panel is in the vertical position. A vehicle including a cargo bed having such a tailgate assembly is also provided.

14 Claims, 4 Drawing Sheets

TAILGATE ASSEMBLIES AND VEHICLES INCLUDING SAME

TECHNICAL FIELD

A tailgate assembly is provided for use with a cargo bed of a vehicle. More particularly, a tailgate assembly is selectively positionable as a step for providing an operator with access to a vehicle's cargo bed.

BACKGROUND

Utility vehicles having a cargo bed with a tailgate are well known in the art. For example, it is common to provide a tailgate on the cargo bed of a truck, sport utility vehicle, or light utility vehicle ("LUV"). The tailgate provides access to the cargo bed and is typically configured to fold down into a position substantially coplanar with the cargo bed. This position of the tailgate allows for the loading and unloading of cargo from the cargo bed. However, a cargo bed of a conventional vehicle is often elevated at a considerable height with respect to the ground. As such, it may be difficult for certain users to lift heavy items into the cargo bed. In addition, passengers often cannot use the tailgate and/or adjacent cargo bed areas of such conventional vehicles to provide supplemental seating during motion of the vehicle without risking injury from contact with debris and terrain beneath the vehicle.

SUMMARY

In accordance with one embodiment, a vehicle comprises a cargo bed extending from a forward end to a rearward end. The cargo bed comprises a left side wall, a right side wall, a bottom wall, and a tailgate assembly. The left side wall extends at least partially from the forward end to the rearward end. The right side wall extends at least partially from the forward end to the rearward end. The bottom wall extends at least partially from the forward end to the rearward end, and further extends at least partially between the left side wall and the right side wall. The tailgate assembly comprises a support panel and a tailgate panel. The support panel extends from the bottom wall and is configured to selectively pivot between horizontal and vertical positions with respect to the bottom wall. The tailgate panel is attached to the support panel. The tailgate panel is configured to selectively define an end wall for the cargo bed when the support panel is in the horizontal position. The tailgate panel is configured to selectively define a step when the support panel is in the vertical position.

In accordance with another embodiment, a tailgate assembly is provided for a cargo bed of a vehicle. The tailgate assembly comprises a support panel and a tailgate panel. The support panel is configured for attachment to a vehicle such that the support panel is selectively pivotable between horizontal and vertical positions. The tailgate panel is attached to the support panel. The tailgate panel is configured to selectively define an end wall for a cargo bed when the support panel is in the horizontal position. The tailgate panel is configured to selectively define a step when the support panel is in the vertical position.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Selected embodiments are hereinafter described in detail in connection with the views of FIGS. 1, 2A-2C, 3A-3C, and 4A-4C, wherein like numbers indicate the same or corresponding elements throughout the views. A vehicle can include a cargo bed and a tailgate assembly. The tailgate assembly can be selectively positionable to serve as a step for providing an operator with access to the cargo bed, and can also be selectively positionable to assist in maintaining cargo within the cargo bed. It will be appreciated that such a vehicle can comprise any type of motor or non-motor vehicle such as, for example, an automobile, truck, sport utility vehicle, golf cart, all terrain vehicle ("ATV"), recreational vehicle, LUV, construction equipment, trailer, camper, or otherwise.

Figure 1:
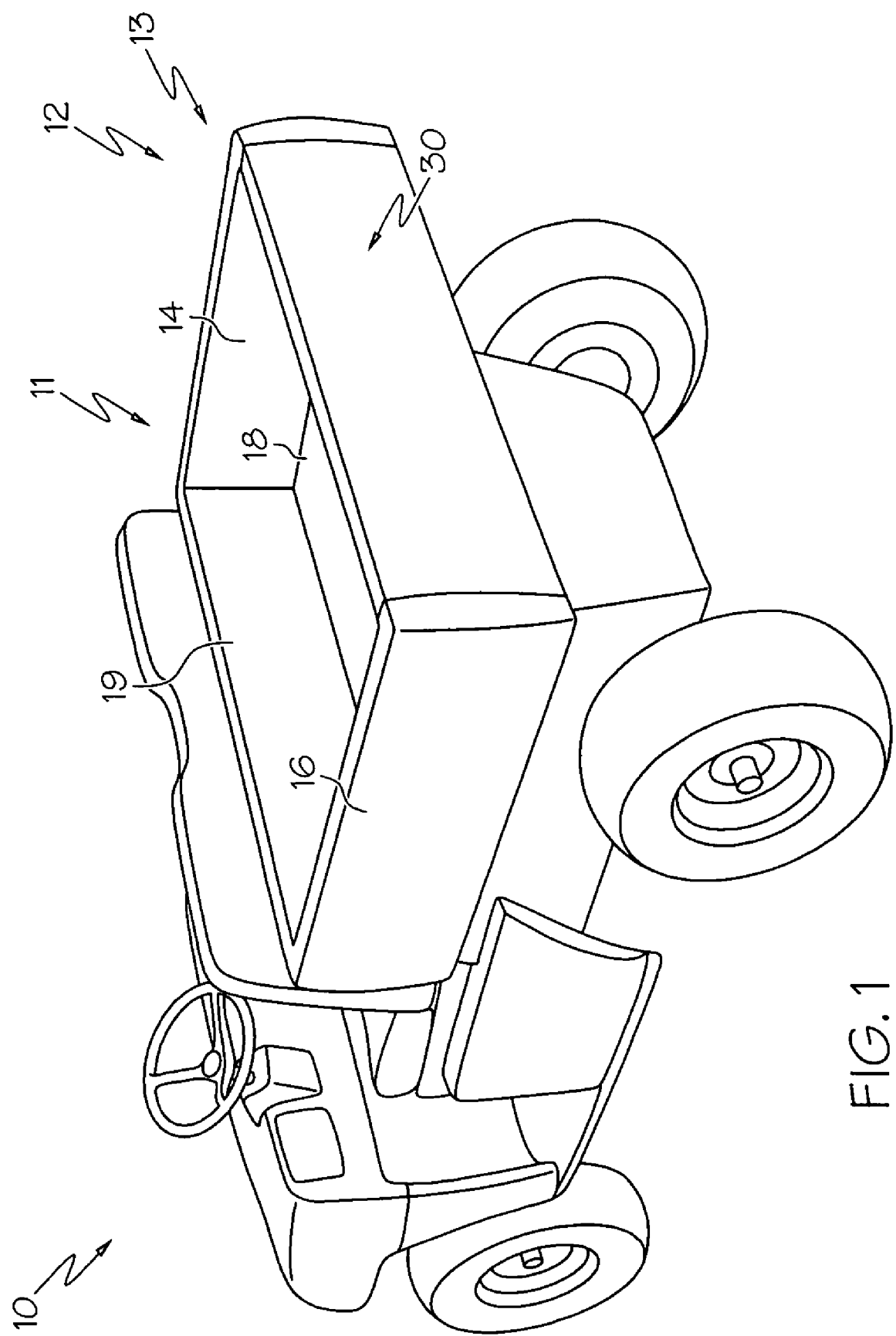
FIG. 1 is a perspective view depicting a light utility vehicle in accordance with one embodiment.

FIG. 1 depicts an LUV 10 having a cargo bed 12 extending from a forward end 11 to a rearward end 13. The cargo bed 12 is shown to include a right side wall 14, a left side wall 16, a bottom wall 18, and a front wall 19. The right side wall 14 can extend at least partially (or substantially completely, as shown in FIG. 1) from the forward end 11 of the cargo bed 12 to the rearward end 13 of the cargo bed 12. Similarly, the left side wall 16 can extend at least partially (or substantially completely, as shown in FIG. 1) from the forward end 11 of the cargo bed 12 to the rearward end 13 of the cargo bed 12. Additionally, the bottom wall 18 can extend at least partially (or substantially completely, as shown in FIG. 1) from the forward end 11 of the cargo bed 12 to the rearward end 13 of the cargo bed 12. The bottom wall 18 can also extend at least partially (or substantially completely, as shown in FIG. 1) between the left side wall 16 and the right side wall 14. For example, in one embodiment, as shown in FIG. 1, the bottom wall 18 may be shaped in a generally rectangular configuration. The front wall 19 can also extend at least partially (or substantially completely, as shown in FIG. 1) between the left side wall 16 and the right side wall 14. The right side wall 16, the left side wall 14, the bottom wall 18, and the front wall 19 can together define an area suitable for containment of cargo for transport by the LUV 10. It will, of course, be appreciated that a cargo bed might have any of a variety of other configurations such as may or may not include one or more of the side walls and/or front wall, for example.

Figure 2A:
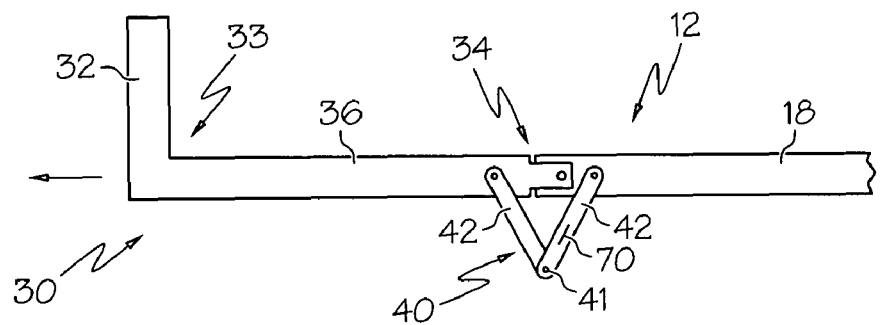
FIG. 2A is a side view depicting selected components of a vehicle having a tailgate assembly in a first position in accordance with a first embodiment.
Figure 2B:
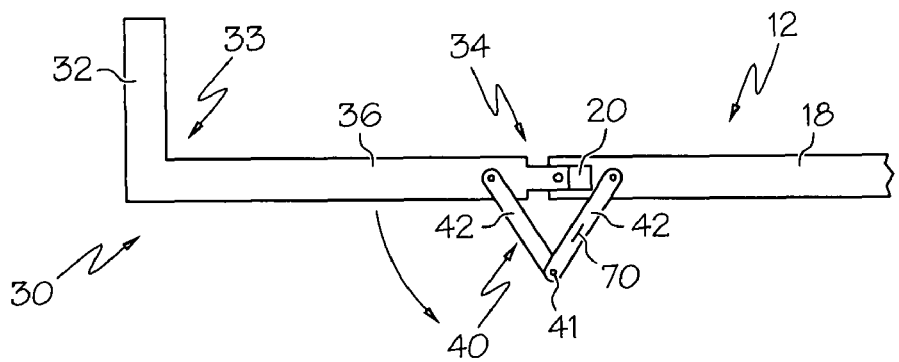
FIG. 2B is a side view depicting selected components of a vehicle having a tailgate assembly in a second position in accordance with the first embodiment.
Figure 2C:
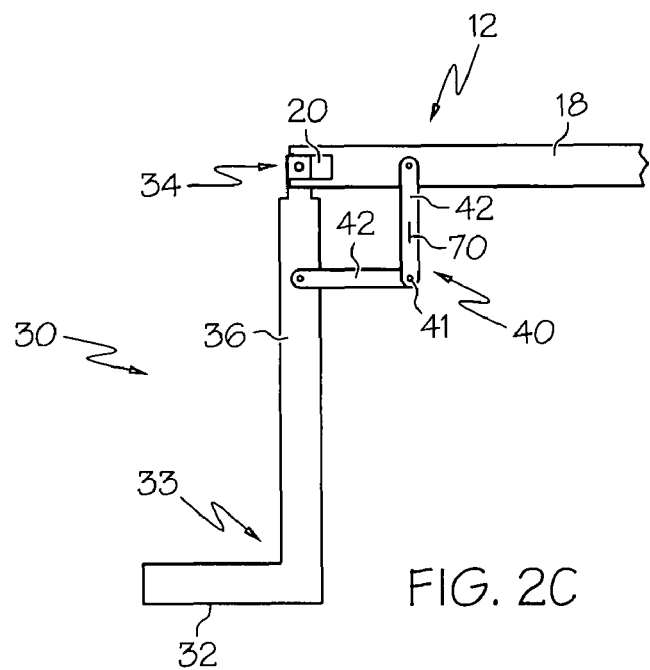
FIG. 2C is a side view depicting selected components of a vehicle having a tailgate assembly in a step position in accordance with the first embodiment.

The LUV 10 is also shown in FIG. 1 to comprise a tailgate assembly 30. One embodiment of a tailgate assembly 30 is shown in FIGS. 2A-2C to include a tailgate panel 32 and a support panel 36. The support panel 36 is shown to extend from the bottom wall of the cargo bed 12 and to be selectively pivotable between horizontal and vertical positions with respect to the bottom wall of the cargo bed 12. The support panel 36 extends from a first end 33 to a second end 34. The tailgate panel 32 is attached to the first end 33 of the support panel 36. When the support panel 36 is in the horizontal position, as shown in FIG. 2A, the tailgate panel 32 can define an end wall for the cargo bed 12. In this position, it will be appreciated that the tailgate panel 32 can cooperate with the right and left side walls 14 and 16 and the bottom wall 18 for securing cargo within the cargo bed 12. When the tailgate panel 32 defines the end wall for the cargo bed 12, the tailgate panel 32 can be disposed adjacent to the right side wall 14 and the left side wall 16 (e.g., as shown in FIG. 1). For example, in one embodiment, the tailgate panel 32, when so positioned, may have a height which substantially corresponds with that of the right and left side walls 14 and 16 (e.g., as shown in FIG. 1). However, when the support panel 36 is in the vertical position (shown in FIG. 2C), the tailgate panel 32 can selectively define a step to facilitate access by an operator to the cargo bed 12, as described further below.

Figure 4A:
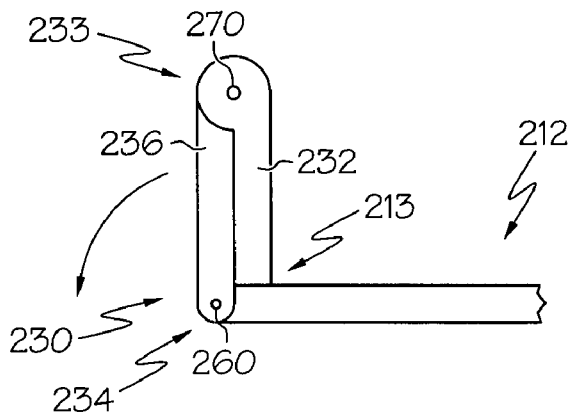
FIG. 4A is a side view depicting selected components of a vehicle having a tailgate assembly in a first position in accordance with a third embodiment.
Figure 4B:
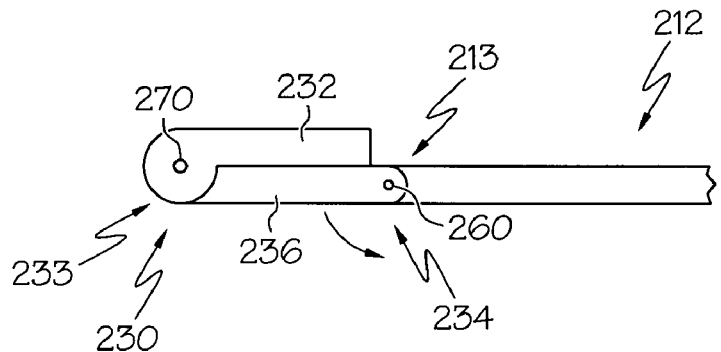
FIG. 4B is a side view depicting selected components of a vehicle having a tailgate assembly in a second position in accordance with the third embodiment.
Figure 4C:
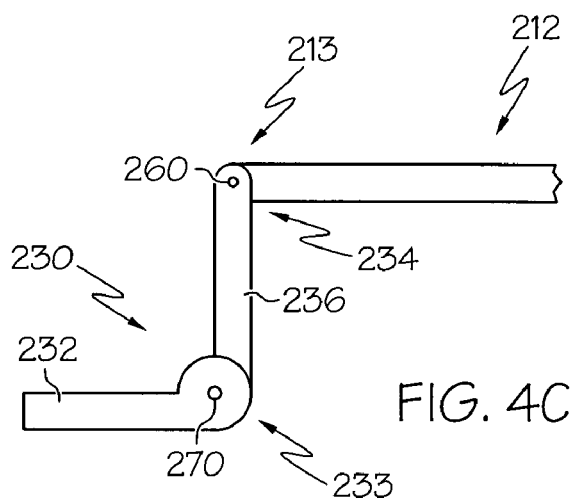
FIG. 4C is a side view depicting selected components of a vehicle having a tailgate assembly in a step position in accordance with the third embodiment.

The tailgate panel 32 can be attached to the support panel 36 in any of a variety of configurations. For example, the first end 33 of the support panel 36 is shown in FIGS. 2A-2C to be fixedly attached to the tailgate panel 32 in a substantially perpendicular arrangement. In another embodiment, as shown in FIGS. 4A-4C, a first end 233 of a support panel 236 is hingedly attached to a tailgate panel 232 such that the tailgate panel 232 is movable between a folded position (shown in FIGS. 4A-4B) in which the tailgate panel 232 is substantially parallel with the support panel 236, and an unfolded position (shown in FIG. 4C) in which the tailgate panel 232 is substantially perpendicular with the support panel 236. It is envisioned that a tailgate panel may be attached to a support panel in any of a variety of alternative configurations, and that this attachment can encompass direct attachment of two or more components and/or indirect attachment of two or more components in which an intermediate component joins the two or more components.

As shown in FIG. 2A, the tailgate assembly 30 may be provided in a first or closed position such that the tailgate panel 32 is substantially vertically positioned at an elevation above the bottom wall 18 for closing the cargo bed 12 (e.g., as in FIG. 1) to prevent cargo from exiting the rearward end 13 of the cargo bed 12. When the tailgate panel 32 is in the closed position, the support panel 36 may be substantially coplanar with the bottom wall 18 and might optionally form a portion of a surface used to support cargo transported by the LUV 10, as shown in FIG. 2A. In other embodiments as shown, for example, in FIG. 3A, when a tailgate panel 132 is in the closed position, a support panel 136 might not provide any significant portion of a surface used to support cargo transported by the vehicle.

Referring again to the example of FIGS. 2A-2C, the second end 34 of the support panel 36 can be slidingly received within a retention chamber 20 defined by the bottom surface 18 of the cargo bed 12 such that the support panel 36 is horizontally movable between a first position (see FIG. 2A) in which the support panel 36 is at least partially disposed within the retention chamber 20, and a second position (see FIGS. 2B-2C) in which the support panel 36 is substantially disposed outside the retention chamber 20. With reference to FIGS. 2A and 2B, it can be seen that the tailgate assembly 30 can be moved from the first position (shown in FIG. 2A) to the second position (shown in FIG. 2B) by at least partially pulling or otherwise withdrawing the support panel 36 from the retention chamber 20. FIG. 2B illustrates the tailgate assembly 30 of FIG. 2A as having been moved (e.g., by pulling) from the first position of FIG. 2A and into a second or extended position. The support panel 36 can be substantially parallel with the bottom wall 18 when sliding between the first position and the second position. In one particular embodiment, the support panel 36 may be positioned upon a track, with rollers and/or with some other interface with respect to the retention chamber 20 to accommodate this movement between the first and second positions.

Once the support panel 36 is moved to the second position (as shown in FIG. 2B), the support panel 36 can be selectively pivoted between horizontal (see FIG. 2B) and vertical (see FIG. 2C) positions with respect to the bottom wall 18 of the cargo bed 12. When in the vertical position, as shown in FIG. 2C, the tailgate panel 32 assumes a third or step position. In particular, FIG. 2C illustrates the tailgate assembly 30 of FIGS. 2A-2B as having been moved (e.g., by pivoting downwardly) from the second position of FIG. 2B and into a third or step position. When in the step position, as shown in FIG. 2C, the tailgate panel 32 can be provided in a substantially horizontal position and at an elevation below that of the bottom wall 18. The support panel 36, however, can be provided in a substantially vertical position extending from the bottom wall 18 of the cargo bed 12 and to the tailgate panel 32. In the step position, as shown in FIG. 2C, it will be appreciated that the tailgate panel 32 may serve as a step for providing an operator with access to the cargo bed 12. In addition, when in the step position, the tailgate panel 32 can provide a footrest for rearward-facing passengers sitting upon the bottom wall 18 near the rearward end of the cargo bed 12. When in this position, the support panel 36 can also provide a barrier to prevent contact of debris and terrain beneath the LUV 10 from contacting the legs of such seated passengers.

In one embodiment, a brace 40 may be attached to both the bottom wall 18 and the support panel 36 as shown, for example, in FIGS. 2A-2C. For example, the brace 40 may include arms 42 which are attached together at a hinge 41 and which accommodate movement of the support panel 36 with respect to the bottom wall 18 such as between the first position (shown in FIG. 2A), the second position (shown in FIG. 2B), and the third position (shown in FIG. 2C). The brace 40 may also be configured to limit pivotal movement of the tailgate assembly 30 with respect to the bottom wall 18 and/or some other portion(s) of the LUV 10. For example, as illustrated in FIGS. 2B-2C, the brace 40 may be configured to limit pivotal movement of the tailgate assembly 30 from the second position (shown in FIG. 2B) to a step position (shown in FIG. 2C).

A locking member can also be provided to selectively retain the tailgate panel 32 in at least one position. For example, the locking member can be configured to selectively retain the tailgate assembly in the first position (shown in FIG. 2A) until such time as an operator affirmatively releases the locking member. The same locking member and/or different locking members might also or alternatively be provided for selectively retaining the tailgate assembly in the second and/or third positions (shown in FIGS. 2B and 2C, respectively). The locking member can include, for example, a handle, lever, clasp, catch, pin, slide-bolt, tab, or some other mechanical interlock device. FIGS. 2A-2C generally depict a locking member 70 being integrated with the brace 40 for selectively restricting movement of the arms 42 relative to one another, and thus movement of the tailgate assembly 30 among respective positions. In alternative embodiments, a locking member can perform a similar function by restricting movement of one or both of the arms 42 relative to the tailgate assembly 30 and/or the bottom wall 18. Regardless of its specific configuration, it will be appreciated that a locking member can be configured to retain a tailgate assembly in its current position (e.g., first, second or third position) until such time as an operator of the vehicle manipulates the locking member to allow movement of the tailgate assembly.

Figure 3A:
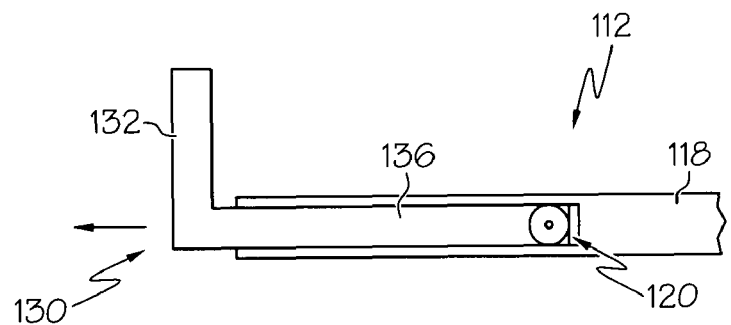
FIG. 3A is a side view depicting selected components of a vehicle having a tailgate assembly in a first position in accordance with a second embodiment.
Figure 3B:
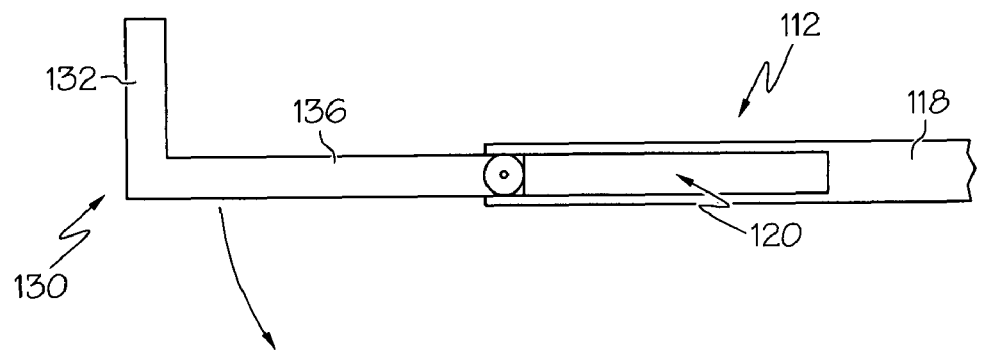
FIG. 3B is a side view depicting selected components of a vehicle having a tailgate assembly in a second position in accordance with the second embodiment.
Figure 3C:
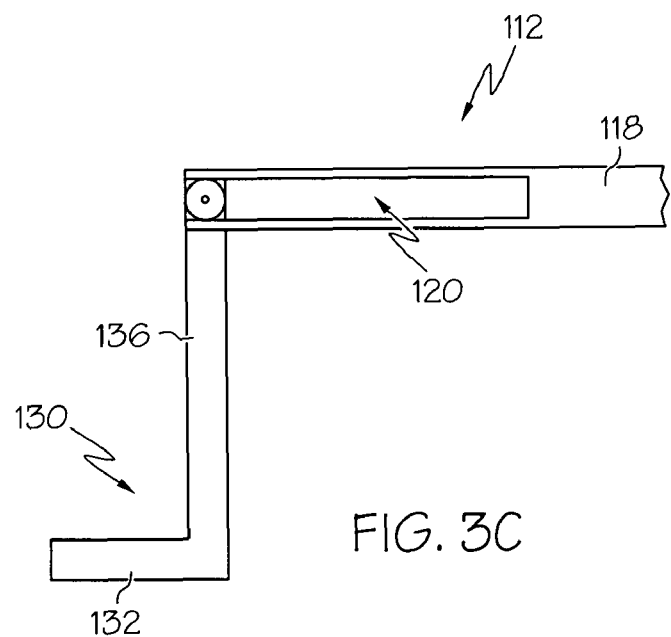
FIG. 3C is a side view depicting selected components of a vehicle having a tailgate assembly in a step position in accordance with the second embodiment.

A tailgate assembly 130 in accordance with another embodiment is depicted in FIGS. 3A-3C and has many of the same features as described above with respect to the tailgate assembly 30 depicted in FIGS. 2A-2C. However, unlike with respect to the tailgate assembly 30 of FIGS. 2A-2C, the support panel 136 of the tailgate assembly 130 of FIGS. 3A-3C is shown to be selectively substantially entirely receivable within a retention chamber 120 provided in a bottom wall 118 of a cargo bed 112. In the embodiment of FIGS. 3A-3C, the retention chamber 120 is shown to be configured to selectively receive substantially the entire support panel 136 of the tailgate assembly 130 when a tailgate panel 132 is positioned for supporting cargo within the cargo bed 112 (see FIG. 3A). To reconfigure the tailgate assembly 130 for providing a step, the tailgate assembly 130 can be pulled such that the support panel 136 is substantially withdrawn from the retention chamber 120 (see FIG. 3B), and the support panel 136 can then be pivoted downwardly with respect to the bottom wall 118 so that the tailgate panel 132 can provide a step to facilitate operator access to the cargo bed 112 (see FIG. 3C).

FIGS. 4A-4C illustrate an alternative tailgate assembly 230 arranged at a rearward end 213 of a cargo bed 212. The tailgate assembly 230 is shown to include the support panel 236 which extends from the first end 233 to a second end 234. The second end 234 of the support panel 236 is shown to pivotally attach to a rearward end 213 of the cargo bed 212 through use of a first hinge arrangement 260. The tailgate panel 232 is shown to pivotally attach to the first end 233 of the support panel 236 through use of a second hinge arrangement 270. The first hinge arrangement 260 can be configured to facilitate pivoting of the support panel 236 from a cargo-retaining position (shown in FIG. 4A), through an intermediate position (shown in FIG. 4B), and to a step position (shown in FIG. 4C). The second hinge arrangement 270 can be configured to facilitate pivoting of the tailgate panel 232 from a folded position (shown in FIGS. 4A-4B) to an unfolded position (shown in FIG. 4C). When the support panel 236 is in the step position and the tailgate panel 232 is unfolded, as shown in FIG. 4C, the tailgate panel 232 can be substantially horizontally oriented for providing a step. Additionally, in this position, the support panel 236 may reduce the risk of injury to passengers seated on the rearward end 213 of the cargo bed 212 resulting from contact with debris and terrain passing beneath the vehicle.

One or both of the first and second hinge arrangements 260 and 270 might include a locking member configured to selectively restrict movement of portions of the tailgate assembly 230 with respect to the cargo bed 212. For example, the first hinge arrangement 260 may include a locking member which is configured to retain the tailgate assembly 230 in a first position (shown in FIG. 4A). However, it will be appreciated that any of a variety of alternative locking members or functions might be provided.

A brace might also be provided as described above for facilitating and/or limiting the available range of movement of the tailgate assembly 230 with respect to the cargo bed 212. For example, in one embodiment, a brace can be removably attached to the first end 233 of the support panel 236 and also to an upper end of a side wall of the cargo bed 212 and, while so attached, might prevent movement of the support panel 236 from the intermediate position (shown in FIG. 4B) to the step position (shown in FIG. 4C). With such a brace so attached, it will be appreciated that the tailgate assembly 230, when in the intermediate position (shown in FIG. 4B), can actually be configured for supporting cargo. The brace may be selectively released by an operator to allow pivoting of the support panel 236 to the step position (see FIG. 4C).

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising a cargo bed extending from a forward end to a rearward end, the cargo bed comprising:
   a left side wall extending at least partially from the forward end to the rearward end;
   a right side wall extending at least partially from the forward end to the rearward end;
   a bottom wall extending at least partially from the forward end to the rearward end, and further extending at least partially between the left side wall and the right side wall; and
   a tailgate assembly comprising:
      a support panel pivotally attached to at least one of the left side wall, the right side wall, and the bottom wall, the support panel being pivotable between a cargo-retaining position and a step position with respect to the bottom wall; and
      a tailgate panel pivotally and directly attached to the support panel;
   wherein
   the tailgate panel is pivotable between a folded position and an unfolded position;
   the tailgate panel is a single, continuous panel;
   the tailgate panel defines an end wall for the cargo bed when the support panel is in the cargo-retaining position and the tailgate panel is in the folded position;
   the tailgate panel is substantially horizontally oriented when the support panel is in the step position and the tailgate panel is in the unfolded position; and
   the support panel extends from a first end to a second end, and wherein the first end of the support panel is hingedly attached to the tailgate panel such that the tailgate panel is movable between the folded position in which the tailgate panel is substantially parallel with the support panel, and the unfolded position in which the tailgate panel is substantially perpendicular with the support panel.

2. The vehicle of claim 1 further comprising a locking member configured to selectively retain the tailgate panel in at least one position.

3. The vehicle of claim 1 wherein the cargo bed further comprises a front wall extending at least partially between the left side wall and the right side wall.

4. The vehicle of claim 1 wherein the tailgate panel is configured for disposition adjacent to the left side wall and the right side wall when the tailgate panel defines the end wall for the cargo bed.

5. A vehicle comprising a cargo bed extending from a forward end to a rearward end, the cargo bed comprising:
- a left side wall extending at least partially from the forward end to the rearward end;
- a right side wall extending at least partially from the forward end to the rearward end;
- a bottom wall extending at least partially from the forward end to the rearward end, and further extending at least partially between the left side wall and the right side wall; and
- a tailgate assembly comprising:
  - a support panel pivotally attached to at least one of the left side wall, the right side wall, and the bottom wall, the support panel being pivotable between a cargo-retaining position and a step position with respect to the bottom wall; and
  - a tailgate panel pivotally and directly attached to the support panel;

wherein the tailgate panel is pivotable between a folded position and an unfolded position;

the tailgate panel is a single, continuous panel;

the tailgate panel defines an end wall for the cargo bed when the support panel is in the cargo-retaining position and the tailgate panel is in the folded position;

the tailgate panel is substantially horizontally oriented when the support panel is in the step position and the tailgate panel is in the unfolded position;

the tailgate panel is substantially perpendicular to the support panel when the support panel is in the step position and the tailgate panel is in the unfolded position;

the support panel is pivotally attached to the rearward end of the cargo bed with a first hinge arrangement;

the tailgate panel is pivotally attached to the support panel with a second hinge arrangement; and the first and second hinge arrangements are configured to selectively retain the support panel in the cargo-retaining position while the tailgate panel is selectively retained in the folded position.

6. A vehicle comprising a cargo bed extending from a forward end to a rearward end, the cargo bed comprising:
- a left side wall extending at least partially from the forward end to the rearward end;
- a right side wall extending at least partially from the forward end to the rearward end;
- a bottom wall extending at least partially from the forward end to the rearward end, and further extending at least partially between the left side wall and the right side wall; and
- a tailgate assembly comprising:
  - a support panel pivotally attached to at least one of the left side wall, the right side wall, and the bottom wall, the support panel being pivotable between a cargo-retaining position and a step position with respect to the bottom wall; and
  - a tailgate panel pivotally and directly attached to the support panel;

wherein the tailgate panel is pivotable between a folded position and an unfolded position;

the tailgate panel is a single, continuous panel;

the tailgate panel defines an end wall for the cargo bed when the support panel is in the cargo-retaining position and the tailgate panel is in the folded position;

the tailgate panel is substantially horizontally oriented when the support panel is in the step position and the tailgate panel is in the unfolded position; and the vehicle further comprises a brace attached to the bottom wall and the support panel, wherein the brace comprises hinged arms which are configured to accommodate movement of the support panel with respect to the bottom wall.

7. A tailgate assembly for a cargo bed of a vehicle, the tailgate assembly comprising:
- a support panel configured for pivotal attachment to a vehicle with a first hinge arrangement such that the support panel is selectively pivotable between first and second positions; and
- a tailgate panel pivotally and directly attached to the support panel with a second hinge arrangement, the tailgate panel being pivotable between a folded position and an unfolded position, the tailgate panel being configured to selectively define an end wall for a cargo bed when the support panel is in the first position, and the tailgate panel being configured to selectively define a step when the support panel is in the second position; wherein each of the first and second hinge arrangements is lockable to selectively retain the support panel in the first position while the tailgate panel is selectively retained in the folded position; and the tailgate panel is a single continuous panel and is configured such that the tailgate panel is substantially horizontally oriented when the support panel is pivotally attached to a vehicle, the support panel is in the second position, and the tailgate panel is in the unfolded position.

8. The tailgate assembly of claim 7 wherein the support panel extends from a first end to a second end, and wherein the first end of the support panel is hingedly attached to the tailgate panel with the second hinge arrangement such that the tailgate panel is movable between the folded position in which the tailgate panel is substantially parallel with the support panel, and the unfolded position in which the tailgate panel is substantially perpendicular with the support panel.

9. The tailgate assembly of claim 8 wherein the first and second hinge arrangements are configured to selectively retain the support panel in the second position while the tailgate panel is selectively retained in the unfolded position.

10. The tailgate assembly of claim 9, further comprising a brace having hinged arms configured to accommodate movement of the support panel with respect to a bottom wall of a cargo bed.

11. The tailgate assembly of claim 9 further comprising a locking member configured to selectively retain the tailgate panel in at least one position.

12. The tailgate assembly of claim 7 wherein the tailgate panel is configured for disposition adjacent to left and right side walls of a cargo bed when the tailgate panel defines an end wall for the cargo bed.

13. A vehicle comprising a cargo bed extending from a forward end to a rearward end, the cargo bed comprising:
- a left side wall extending at least partially from the forward end to the rearward end;
- a right side wall extending at least partially from the forward end to the rearward end;

a bottom wall extending at least partially from the forward end to the rearward end, and further extending at least partially between the left side wall and the right side wall; and a tailgate assembly comprising:

a support panel pivotally attached to at least one of the left side wall, the right side wall, and the bottom wall, the support panel being pivotable between a cargo-retaining position and a step position with respect to the bottom wall; and a tailgate panel pivotally and directly attached to the support panel;

wherein the tailgate panel is pivotable between a folded position and an unfolded position;

the tailgate panel is a single, continuous panel;

the tailgate panel defines an end wall for the cargo bed when the support panel is in the cargo-retaining position and the tailgate panel is in the folded position;

the tailgate panel is substantially horizontally oriented when the support panel is in the step position and the tailgate panel is in the unfolded position; and the cargo-retaining position of the support panel and the step position of the support panel are substantially opposite in direction with respect to the pivotal attachment of the support panel to the at least one of the left side wall, the right side wall, and the bottom wall of the cargo bed.

14. A vehicle comprising a cargo bed extending from a forward end to a rearward end, the cargo bed comprising:

a left side wall extending from the forward end to a rearward-most extent of the rearward end;

a right side wall extending from the forward end to the rearward-most extent of the rearward end;

a bottom wall extending from the forward end to the rearward end, and further extending between the left side wall and the right side wall; and a tailgate assembly comprising:

a support panel pivotally attached directly to at least one of the left side wall, the right side wall, and the bottom wall, the support panel being pivotable between a cargo-retaining position in which the support panel extends above the bottom wall, an intermediate position in which the support panel is substantially parallel with the bottom wall, and a step position in which the support panel extends from and below the bottom wall and is substantially perpendicular to the bottom wall; and a tailgate panel pivotally and directly attached to the support panel, the tailgate panel being pivotable between a folded position and an unfolded position such that when the support panel is in the step position and the tailgate panel is in the unfolded position the tailgate panel is substantially horizontally oriented for providing a step.

* * * * *